May 5, 1970 — T. S. DURAND — 3,510,834
OPTICAL LANDING SYSTEM
Filed Dec. 27, 1966 — 7 Sheets-Sheet 1

INVENTOR.
TULVIO S. DURAND
BY [signature]
ATTORNEY

INVENTOR.
TULVIO S. DURAND

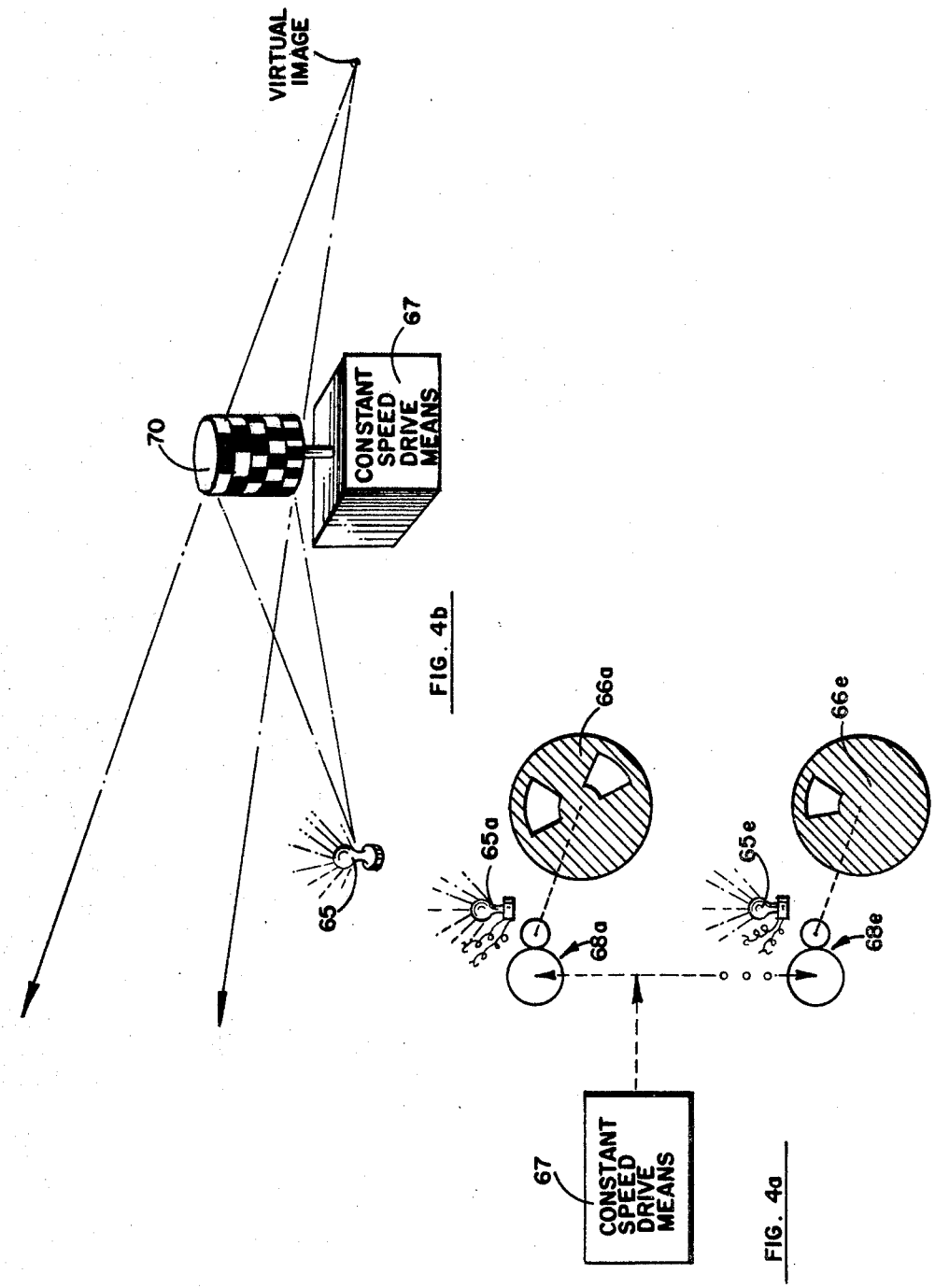

United States Patent Office 3,510,834
Patented May 5, 1970

1

3,510,834
OPTICAL LANDING SYSTEM
Tulvio S. Durand, Inglewood, Calif., assignor to
Systems Technology, Inc.
Filed Dec. 27, 1966, Ser. No. 605,070
Int. Cl. G08g 5/00
U.S. Cl. 340—27
14 Claims

ABSTRACT OF THE DISCLOSURE

The subject invention relates to an optical positioning system employing an array of stacked beams of light energy, each beam being amplitude-modulated at a mutually exclusive modulation frequency. The system includes a receiver responsive to the light energy and comprising a plurality of tuned signalling channels, each tuned to a different one of the modulation frequencies for exciting an associated display indicator element. The display indicator elements are arranged in a like sequence and array as the corresponding modulated beams to which the indicator elements respond, whereby an indication is conveniently provided as to the location of the receiver within those ones of the stacked energy beams to which it responds.

BACKGROUND OF THE INVENTION

The terminal maneuvering and landing of a manned aircraft are preferrably performed by the pilot himself, because of the criticality of such maneuver and the lack of pilot confidence in automated sequences of limited reliability, and over which the pilot feels he has little or no control. Even in those situations where the terminal maneuver is performed automatically, manual override provisions are generally provided, whereby the pilot may monitor or override the automatic function. However, where the pilot either monitors such function or is, himself, to perform the terminal or glide path maneuver preparatory to landing his vehicle, it is necessary to provide reliable means for displaying to him the situation of his vehicle relative to a preselected or desired flight path in space, whereby he may be enabled to exercise proper control of the flight path of his vehicle. The need for such display situation is especially critical in the case of attempting a landing aboard an aircraft carrier because of the limited area or deck space within which to effect the landing, and the movement of the aircraft carrier itself.

One prior art means of effecting such display is the use of an optical system aboard the carrier for projecting a vertical array of mutually angled or stacked beams of collimated light relative to a lighted datum or illuminated reference. A type of such system in use in the U.S. Navy is referred to as a Fresnel Lens Optical Landing System, MK6 MOD I, as described in Bureau of Weapons Technical Manual, NAVWEPS 51-40ABA-5, dated Dec. 1, 1965. Such device, because of the optics employed, presents to a pilot aloft and within the illumination of one or more of the stacked light beams, a display of a substantially horizontal bar of collimated light displaced vertically relative to the datum or reference lights in a direction indicative of the vertical deviation or direction of the aircraft relative to the desired glide path. Such a device provides a practical reference for the pilot because his visual contact with the aircraft carrier is not disturbed or distracted by the use of such device. Also, such a device is highly reliable, relative to complex electronic gear such as sophisticated radar equipment. (Further, should a failure of such optical data link occur, such failure is immediately apparent to a pilot who is within visual contact of the aircraft carrier.)

Such prior art device suffers from several inherent shortcomings, however. First, the size of the display presented to the pilot decreases with increasing ranges or longer distances from the aircraft carrier, aboard which the device is employed. Thus, a given glide slope error in the pilot's flight path results in a visual display which provides a lesser "cue" at greater distances from the landing point than at closer ranges (such as the landing point) where such display occupies a greater view angle in the pilot's field of view. Such variation is significant in the case of high performance aircraft which land at exteremly high airspeeds, allowing little time (or distance) in which to effect a correction in a glide-slope, or landing, maneuver upon the pilot's discerning the need for correction. In other words, at those larger ranges, which are adequate for more effective landing path control, a lesser cue is provided the pilot of the control action necessary, while at closer ranges, the greater cue provided by the larger field of view occupied by the display may induce the pilot to "over control" the vehicle. Another performance limitation at maximum ranges occurs due to the resolution limits of human sight in discerning a display or visual cue, such resolution limit being about one minute of arc. The maximum useful range of the above mentioned Fresnel Lens Optical Landing System, for example, is limited to about 1¼ miles under ideal conditions of visibility which, at normal landing speeds of high speed aircraft represents a time-to-touchdown interval of only about 40 seconds.

Another disadvantage of such prior art optical system is the variation brightness of the display. Such variation has several aspects: the variation in the relative brightness of the display at far distances relative to near distances, the display appearing brighter the nearer the vehicle approaches the landing point; and the variation in relative brightness of the display relative to ambient light conditions, the display appearing brighter at night or under low light level conditions and appearing less bright under daylight conditions, particularly when landing toward a direction from which the sun is shining (e.g., landing "into the sun"). Such variations in relative brightness tend to vary the cue presented to the pilot and hence, vary his response to a given flight path error display. Under conditions of extremely bright ambient light conditions, such display may even be undiscernible.

A further disadvantage of such prior art shipboard optical system is that the complete reliance upon visual contact renders the system useless under conditions of fog or haze or stack smoke at usual initial glide path ranges or distances, or during security conditions, when all visible shipboard lights are extinguished in order to conceal the position of the aircraft carrier.

SUMMARY OF THE INVENTION

By means of the concept of the subject invention there is provided local indicating means located on an observer's platform in a preselected geometrical relationship thereto for reproducing a remotely located optical display indicative of those ones of a stacked array of light beams by which the platform is illuminated, whereby the disadvantages of the prior art may be avoided.

In a preferred embodiment of the subject invention, there is provided means for determining that one of an array of stacked radiant energy beams by which a platform is illuminated, comprising means for intensity modulating at least a portion of the spectrum of each of the energy beams at a mutually exclusive modulating frequency. There is also provided sensor means adapted to be mounted on the platform and further adapted to be responsive to the modulated spectrum of the radiant energy beams and having a plurality of narrow bandpass outputs, the center frequency of each of which corresponds to a mutually exclusive one of the modulating frequencies.

In normal operation, of the above described arrangement, the sensor means, when illuminated by one of the intensity-modulated light beams of the stacked array, will provide an output signal at that one of its outputs having a bandwidth inclusive of the modulating frequency associated with such light beam. Hence, observing that one of the sensor outputs providing an output signal enables identification of that energy beam by which the sensor is illuminated. In the case of two sensor outputs being excited simultaneously, the sensor is thus determined to be located in a region in which the associated two beams overlap. By observing changes in the relative intensities of the two beams, relative to each other, an observer may determine or anticipate the motion of the sensor toward the center of the beam associated with the waxing output signal and away from the center of the beam associated with the waning signal.

By means of the above described arrangement, an optical landing aid is provided which presents a local display of fixed geometry to the pilot, regardless of the range or distance of the pilot's aircraft from the landing field. Also, even though discrete display "cues" are provided by such local display, a relative variation or intensity differential between two adjacent ones of the discrete display elements of the display device better enables the pilot to anticipate or determine the motion of his vehicle from one to another of two adjacent ones of discrete situations (such as movement from a position "on the glide path" to a position "above the glide path"), whereby appropriate control action may be timely undertaken and "overcontrol" avoided. Accordingly, it is an object of the subject to provide an optical landing aid providing an improved display.

It is another object of the invention to provide an optical landing aid display having a preselected geometrical relationship to an observer, whereby an improved "cue" is presented at larger distances from a landing area utilizing an optical landing system.

It is still another object of the invention to provide a local optical landing display indicator for use at initially large glide-path distances and allowing a convenient operator transition from reliance on such indicator to direct visual contact with a remotely-located optical landing aid projector.

A further object of the invention is to provide an improved local optical display indicating system which may be made to conveniently cooperate with present optical landing systems.

A still further object of the invention is to provide an improvement in present optical landing systems by means involving minimum modifications thereto.

These and further objects of the invention will become apparent from the following description taken together with the accompanying drawings in which:

BRIEF DESCRIPTION OF THE DRAWINGS

FIGS. 4a and 4b are alternative schematic arrangements of a portion of the modulated array of FIG. 2, illustrating exemplary arrangements for the modulation thereof;

In the figures, like reference characters refer to like parts.

DESCRIPTION OF PREFERRED EMBODIMENT OF THE INVENTION

Figure 1:
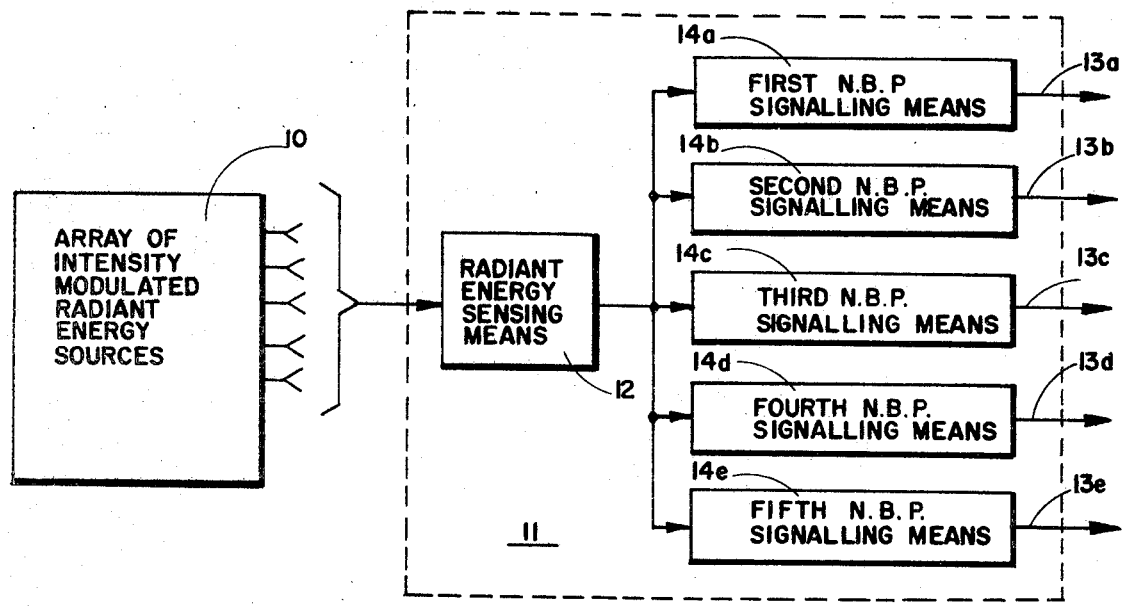
FIG. 1, including bandpass-limited signal-normalizing inventive concept.

Referring now to FIG. 1, there is illustrated in block diagram form a system embodying the inventive concept. There is provided means 10 for transmitting a stack array of radiant energy beams, each beam intensity-modulated at a mutually exclusive modulating frequency. There is also provided means 11 adapted to be mounted on a remote platform and further adapted to be responsive to the modulated spectrum of the radiant energy beams and having a plurality of narrow bandpass outputs $13a$, $13b$, $13c$, $13d$ and $13e$, the center frequency of each output corresponding to a mutually exclusive one of the modulating frequencies by which the array of radiant energy beams are modulated.

Receiving means 11 is comprised of a single common radiant energy sensor 12 responsive to the bandwidth of radiant energy transmitted by transmitting means 10 and having an electrical output indicative of a sensed modulation envelope. Receiving means 11 is further comprised of a plurality of narrow bandpass signalling means $14a$, $14b$, $14c$, $14d$ and $14e$, each having a center frequency corresponding to a mutually exclusive one of the transmitted modulating frequencies, for indicating the identity of those beams in the array of stack beams by which the sensor 12 is illuminated.

Figure 2:
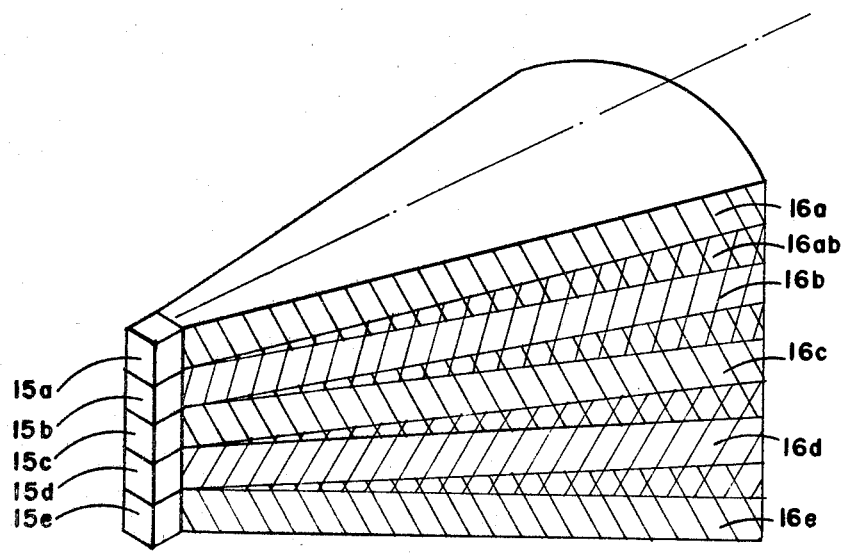
FIG. 2 is a schematic arrangement of the array of FIG. 1, and illustrating the stacked energy-beams employed by the inventive device.

The cooperation and use of the system of FIG. 1 may be more conveniently understood from the geometrical arrangement of FIG. 2.

Referring now to FIG. 2, there is illustrated a schematic arrangement of the transmitting array 10 of FIG. 1, and illustrating the stacked energy beams employed by the inventive device. Array 10 is comprised of a plurality of mutually spaced energy-transmitting means $15a$, $15b$, $15c$, $15d$ and $15e$, each providing a beam of intensity-modulated energy $16a$, $16b$, $16c$, $16d$ and $16e$, each beam modulated at a mutually exclusive modulating frequency. Each of such beams, in an aircraft landing aid system, may correspond to one of several glide slope paths, the center one $16c$, say, corresponding to a preselected reference or desired flight path. Such light sources may, if desired, be viewed relative to two horizontally in-line datum light sources (not shown) placed on either side of the reference source $16c$ and collimated parallel to the collimation of source $16c$.

When sensor 12 of FIG. 1 is located within one of the beams 16 and oriented toward the source thereof so as to respond thereto, a signal is generated at the output of sensor 12 which has a periodicity corresponding to the modulating frequency by which such beam is modulated. Such output signal will appear at only that one of the discrete outputs 13 of FIG. 1 having a bandpass inclusive of such periodicity. In this way, the identity of that one of the stacked beams by which the sensor is illuminated may be determined by observing that one of the discrete receiver outputs which responds to such illumination. Where two outputs respond, representing adjacent beams of the beam array, this indicates that the sensor is located in that region where the two beams overlap. For example, two receiver outputs corresponding to the modulations associated with beams 16a and 16b of FIG. 2 would indicate that the sensor was located in the region 16ab of the overlap of beams 16a and 16b.

The plurality of signalling means 14 of the sensor-receiver 11 of FIG. 1 may be correspondingly arrayed geometrically as the beam array of FIG. 2 to which they are intended to respond, a topmost signalling element 14a of FIG. 1 corresponding to beam 16a and responding to source 15a of FIG. 2, for example. In this way, a convenient correspondence is provided between such display and the pilot's visual contact with the projector 10 (of FIG. 1), as to reduce a likelihood of confusion in transferring his attention from one to the other. Such a transfer of attention would occur, for example, in checking via direct visual contact that projector 10 is operating and then employing the local receiver-indicator 11 at initial landing maneuver distances, because of the improved cue provided by the larger field of view thereof. A second transfer of attention occurs nearer the landing touchdown point when the pilot would prefer to maintain direct visual contact with the display projector and the landing point because of the improved field of view, and hence "cue" provided by the projector, and the pilot's desire for direct visual contact with the landing point during the terminal phase of the landing maneuver.

Figure 3:
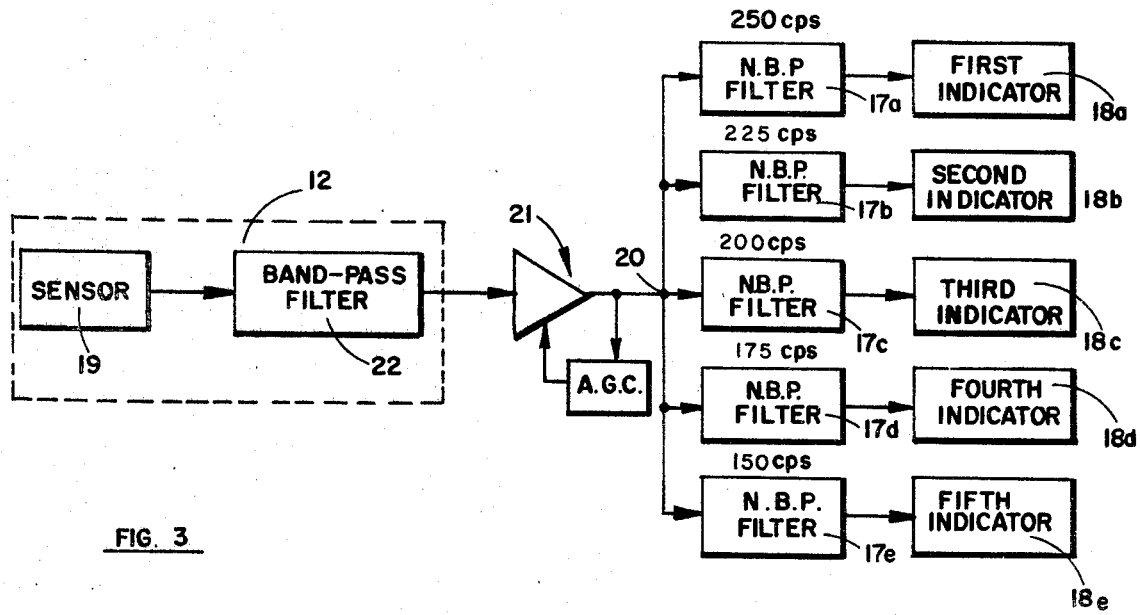
FIG. 3 is a block diagram of the receiver-indicator of FIG. 1, including bandpass-limited signal-normalizing means.

Also, in order to further reduce pilot distraction in effecting a local display on-board the aircraft-to-be landed, the intensity modulation frequencies are selected to lie above that frequency (40 c.p.s.) discernible to the human eye (e.g., the fusion flicker frequency). A representative band of frequencies may be above 100 c.p.s. and below 400 c.p.s., as shown in FIG. 3. Such lower frequency is imposed by considerations of background noise energy from the sky and water flicker below 100 c.p.s., while the upper frequency corresponds to electrical noise due to aircraft equipment operated at 400 c.p.s. As illustrated in FIG. 3, a representative group of five discrete frequencies employed for the receiver narrow band signalling means (and, hence, for the intensity modulated sources of FIG. 2) are 250, 225, 200, 175, and 150 c.p.s. Where a 60 c.p.s. power source may be used to excite the display projector or lamps for the light sources 15 of FIG. 2, it is noted that the indicated group of frequencies is above such 60 c.p.s. frequency and its second harmonic, 100 c.p.s.

As indicated in FIG. 3, each of the narrow band signalling means 14 of FIG. 1 may be comprised of a narrow bandpass filter circuit 17 the output of which may be coupled to excite an indicator 18. Such filter output may be directly coupled to an indicator lamp or may be employed to control a relay for excitation of indicator 18, by any of a number of means well understood in the art. The construction and arrangement of filter circuits is also well known in the art and therefore, element 17 is shown in FIG. 3 in block form only. In order that the responses of the receiver of FIG. 3 not vary as a function of the range or distance from (or brightness of) the source lamps of FIG. 2, bandpass-limited automatic gain control means 21 is interposed between the output of the sensor 17 and the common filter input terminal 20. In this way, the response of that filter associated with a sensor position in a given beam of FIG. 2 will tend to be substantially invarient with variations in the sensed energy level, and intensity modlated at that modulation frequency corresponding to the center frequency of such filter. Further, where the sensor is located in the overlap of two beams, the stronger response from one of two associated filters indicates that the sensor is closer to the corresponding beam, while the waxing and waning, respectively, of respective ones of the signals indicates the motion of the sensor platform away from the beam associated with the waning signal and toward the beam associated with the waxing signal.

Bandpass limiting of the AGC function is desired in order that such function not also respond to modulation frequencies outside the modulation frequency band of interest, whereby such spectral response of the AGC circuit would unnecessarily compress or attenuate the signals of interest. Accordingly, such bandpass limiting in FIG. 3 may be accomplished within the AGC stage 21 itself, or by means of a bandpass filter 22 having an input coupled to the output of sensor 19, the input of AGC means 21 being responsively coupled to the output of filter 22. The construction and arrangement of circuit elements 21 and 22 are well known in the art and, therefore, these elements are shown in block form only for convenience in exposition.

Photosensitive detector 19 may be of any type responsive to the (modulated) spectral energy distribution of source 10 of FIG. 1 (or source elements 15 of FIG. 2). However, in a receiver intended to respond primarily to non-visible energy in the near infrared region, for example, a photo conductor of the lead sulfide type may be preferred. Such a lead sulfide type detector, in addition to having a high spectral sensitivity in the near infrared range, operates well with bias voltages below 100 volts, making it relatively easy to employ with solid-state electronic circuitry. It is also to be preferred for the wider dynamic range (e.g., larger signal) level at which saturation occurs. Further, satisfactory operation may be obtained without special cooling provisions for such detector. Other suitable types of detectors or photoconductors for such non-visible infrared application may include indium antimonide and lead telluride.

The employment of the near infrared spectral region may be preferred because of the relatively high level of energy generated in such portion of the overall spectral region of the energy emitted by the projection lamps and the low threshold detection levels obtainable with I.R. detectors, as to assure adequate performance at larger ranges or distances from such lamps. Where a selected infrared region of the transmitted spectral energy is employed, then a suitable filter such as a colored glass (such as Corning type No. 7–57), or like means known in the art, may be employed at the optical input to sensor 19 in order to further restrict the spectral response thereof, and to further reduce the likehilhood of response saturation to a sensed spectral energy distribution.

Where the entire transmitted spectra provided by the sources 15 of FIG. 2 are mechanically chopped or periodically optically blocked to effect intensity modulation of each of the sources at a desired modulation frequency, the average visible light level discernible to the pilot is reduced, thereby reducing the maximum range or distance at which the pilot may effectively search for, and establish direct visible contact with the projection lamp device, located proximate to an intended landing point. However, such reduction in the average level of the visible portion of the transmitted spectrum may be avoided by the modulation of only that non-visible portion of the transmitted spectrum which is of inerest (e.g., the infrared region). Such selective modulation may be achieved by means of mechanical choppers employing an I.R. absorption filter material such as, for example, Corning type 1–69 glass which, while absorbing or substantially blocking the infrared spectrum, does not substantially attenuate the visible spectrum. Speed control means must be employed with such mechanical choppers in order to maintain the modulation frequency of each within the bandwidth of an associated one of the narrow pass filters or frequency discriminating means of the receivers of FIGS. 1 and 3. In order to reduce the cost of such speed regulation, it may be preferable to employ a simple common speed regulating unit for commonly driving all of the choppers, with suitable gear-ratios or like speed-changing means interposed between the common speed regulated drive and each chopper, as shown more particularly in FIG. 4a.

Referring to FIG. 4a, there is illustrated an exemplary arrangement of the coding or modulating aspects of the transmitter 10 of FIG. 1. There is illustrated a plurality of lamps 65 corresponding to those which may be employed in the sources 15 of FIG. 2, and a like plurality of mechanical choppers 66 for periodic intensity modulation of lamps 65. Each mechanical chopper is illustrated as an apertured opaque disc, interposed in the optical path of a mutually exclusive one of lamps and rotatably driven by a common speed-regulated drive means 67. The modulation frequencies obtainable by such an arrangement may be adjusted by adjusting the speed of the regulated drive means; while the frequency ratios of the modulation frequencies provided by the different choppers are determined by the number of regularly spaced apertures selected for each disc or by the speed ratios selected for the transmission drives 68 coupling the choppers to the speed drive 67, or by a selected combination of number of apertures and transmission speed ratios. Although such exemplary modulation arrangement has illustrated an apertured disc as a mechanical chopper, the concept of the invention is not so limited. Other arrangements may be alternatively employed, such as, for example, a paddle wheel arrangement of at least two paddles or blades of material opaque to at least that portion of the spectrum to be modulated, the axis of each paddle wheel oriented transversely of the optical path of an associated lamp.

Also, although the exemplary mechanical choppers of FIG. 4a have been shown to be coupled to a common regulated speed drive by means of speed transmission means or gear trains representing preselected transmission speed ratios or gear ratios, the concept of the device is not so limited. Any suitable alternative arrangement may be employed such as a plurality of frequency-generating means or frequency dividing means responsive to a single common source of frequency-regulated A-C power for providing a plurality of A-C sources having a preselected set of frequency ratios, and a plurality of synchronous motors, each in driving relation to a mutually exclusive one of the choppers and responsive to an associated one of the plurality of A-C sources.

A still further alternative arrangement of obtaining an array of stacked light beams, each beam intensity-modulated at a selected modulating frequency is shown in FIG. 4b. In such an arrangement, the chopper comprises a mirror arrangement which alternately reflects and absorbs the radiant energy radiated from a source lamp. A vertical array 70 of mutually concentric, axially spaced cylindrical reflecting surfaces cooperates with lamp 65 to provide a corresponding vertical array of stacked light beams, corresponding to the light beam array of FIG. 2. Each cylindrical surface section includes regularly spaced absorbent surfaces corresponding to the vanes of the above described paddle wheel or to the non-apertured portion of the discs of FIG. 4a. By rotating the drum or vertical array 70 of cylindrical sections, the light impinging on each section is alternately reflected and absorbed, thereby providing a light beam which is intensity modulated at a frequency which is adjusted by the speed at which the array of cylindrical sections is commonly ratated by drive means 67. A selected set of frequency ratios is obtained among the modulation frequencies by selection of the number of alternate reflective and non-reflective areas provided an each cylindrical section, corresponding to the selection of a combination of gear ratio and number of apertures for each mechanical chopper device in the arrangement of FIG. 4b.

A specific arrangement of the projection optics associated with the modulation means of FIGS. 4a and 4b has been omitted. Such arrangement is not an aspect of the invention and, being well understood in the art, is a matter of choice in design.

The utility of a bandpass-limited automatic gain control amplifier has been described in connection with the description of the receiver-indicator arrangement of FIG. 3. The usual range of signal input levels over which such AGC means is effective tends to be limited, and in any event is of no effect if signal saturation occurs elsewhere in the receiving system, such as, for example, saturation of the sensor or of a preamplifier stage in response to the total received energy spectrum. In other words, the response of the photoelectric sensor and an associated preamplifier may tend to saturate due to exposure to a high-energy level environment, despite the use of an optical filter for bandpass limiting the senior input to that infrared portion of the radiant energy spectrum, including the intensity-modulated spectrum transmitted by the source array of FIGS. 1 and 2. Such saturation tends to occur because the field of view of the receiver sensor needs be made larger than the field of view occupied by the transmitter projector array at the maximum range (at least two and one-half miles) at which the airborne receiver is intended to detect the projector, in order to assure such detection. Accordingly, aperture-adjusting means is preferably included in the received optics for augmenting the function of the AGC circuit and for protection of the photoelectric sensor from damage due to exposure to the direct rays of the sun or the sun's auerole, as shown more particularly in FIGS. 5 and 6.

Figure 5:
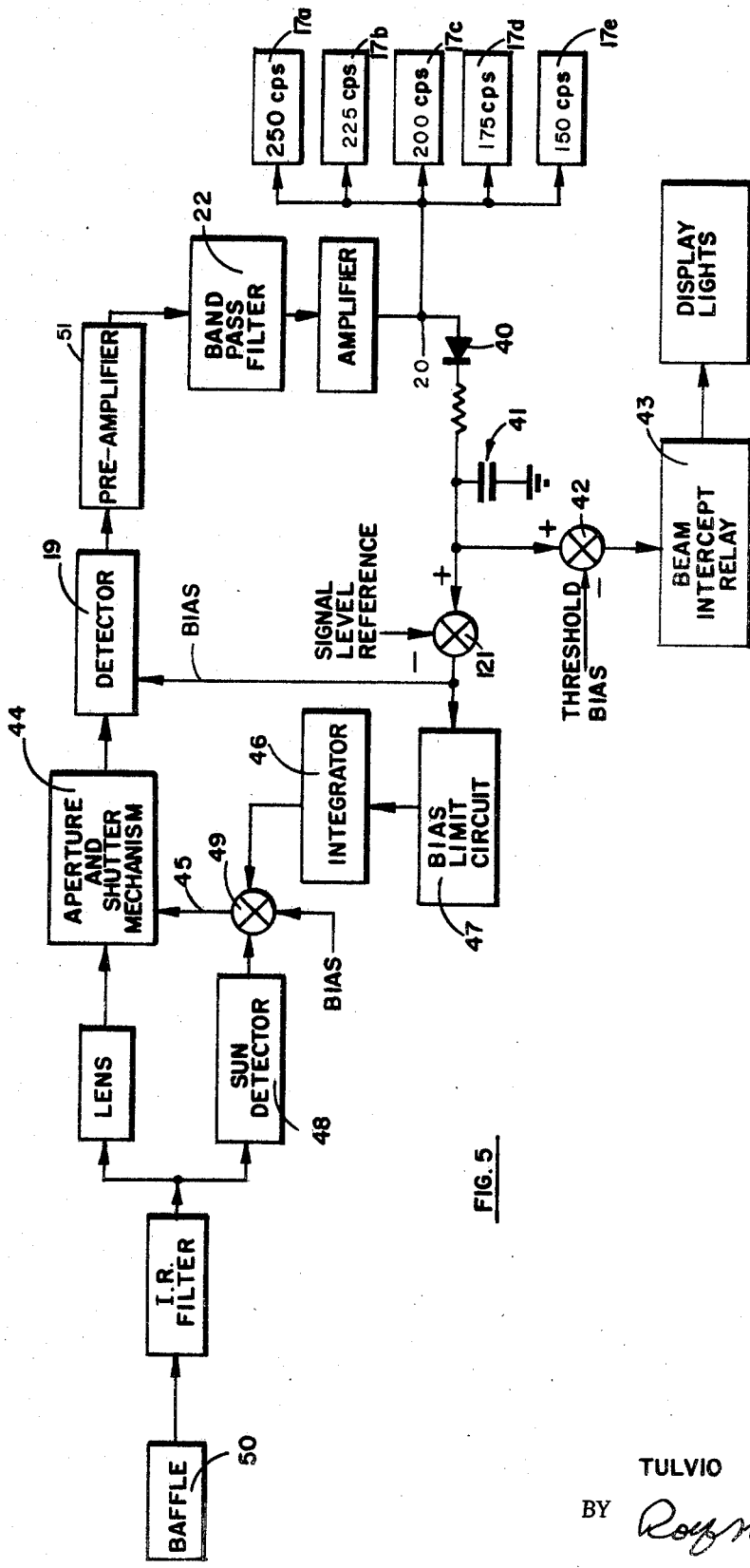
FIG. 5 is a block diagram of a preferred embodiment of the receiver subsystem of the inventive concept.

Referring now to FIG. 5 there is illustrated in block diagram a preferred embodiment of the modulation detector or receiving system of the inventive concept. There is provided a sensor 19, bandpass filter 22 and a plurality of narrow bandpass signal utilizing means 17 arranged to cooperate substantially the same as like referenced elements of FIG. 3. The automatic gain control function provided by element 21 of FIG. 3 is achieved alternatively in the arrangement of FIG. 5 by controlling the D-C bias level applied to lead sulfide cell 19 of FIG. 5 by gain control means 121, in response to variations in the A-C output level of bandpass filter 22 (as detected by detection means, such as a suitably-poled diode 40 and low-pass R-C filter network 41), from a reference signal level.

The gain control signal from network 41 may also be compared by means of signal comparator 42 with a threshold bias signal corresponding to the system noise level response (in the absence of a system input or received modulated signal) for providing an output indicative of the interception or reception of a signal of interest. Such output may be used to excite a relay 43 or like means for providing a display, indicating to the pilot that (1) the system has intercepted the array of stacked light beams and (2) he may initiate the terminal glide-path and landing maneuver. For example, the excitation of the situation display indicators 18 of FIG. 3, in response to the filters 17, may be controlled by logic switching provided by relay 43.

Figure 6:
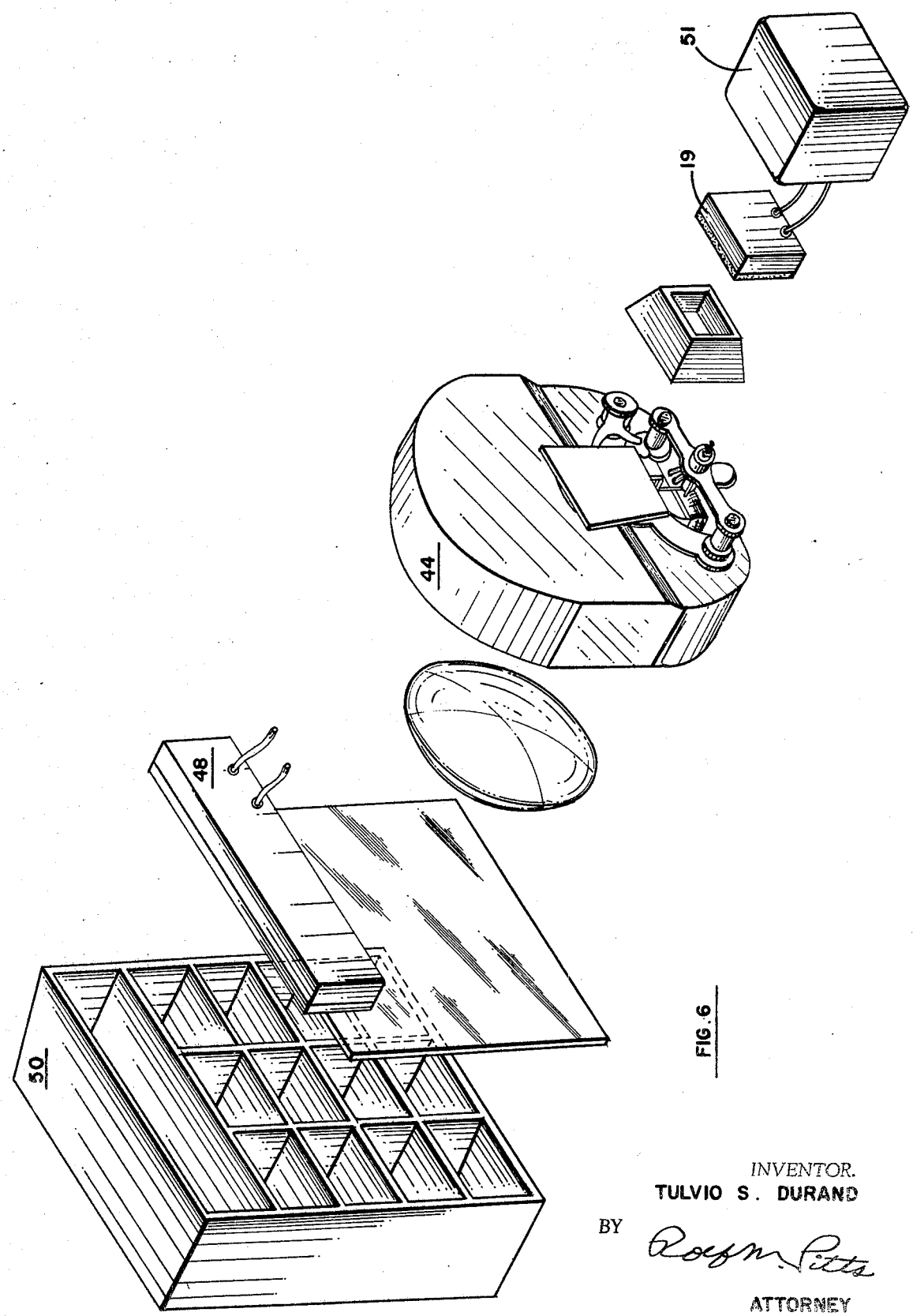
FIG. 6 is an exploded view of a portion of the receiver optics of the device of FIG. 5.

The controlled bias voltage, applied to sensor 19 from gain-control means 121, may also be employed to drive an adjustable aperture mechanism 44, such as a D'Arsonal-movement driven aperture, shown more particularly in FIG. 6. That portion of the output of gain control means 121 above a certain level (corresponding to near saturation of the AGC signal compression function) is applied to the aperture control circuit on line 45. Such bias-limiting of the unipolar AGC output of element 121 may be accomplished by any threshold signalling circuit 47 known in the art.

Signal integrating means 46, such as a Miller integrating amplifier, may be interposed between the output of the bias limit circuit 47 and the input 45 to the adjustable aperture mechanism 44. Hence, in normal operation, the aperture mechanism 44 will continue to drive until the output of the bias limiter 47 is nulled, indicating that neither the AGC signalling means 121 nor the sensor 19 are saturated. In other words, such null indicates that the aperture has not been closed so much as to reduce the level of the light energy into sensor 19 as to result in saturation of the automatic gain control function; nor has the aperture been opened so much as to either saturate sensor 19 or to exceed the signal compression limits of the electronic gain control function.

The time-constant of integrator 46 limits the speed at which the aperture would be reduced in response to a sudden exposure of the sensor 19 to damage from the direct rays of the sun. Also, the aperture control loop may not respond to such energy, where free of modulation within the bandwidth of bandpass filter 22. Moreover, it is not desirable to employ the sensor-to-be-protected, for the detection of levels of energy from which it is to be protected. Accordingly, a solar sensor 48, having reduced sensitivity to higher levels of solar energy, is employed for such purpose in the arrangement of FIG. 5. The output of solar cell 48 is compared with a bias signal indicative of a safe energy limit by means of a signal comparator 49, and the sense of the difference therebetween employed to control electrically operated shutter mechanism 44.

An exploded view of an exemplary arrangement of the optical assembly portion of FIG. 5 is shown in FIG. 6. As illustrated in FIG. 6, a light baffle 50 is provided to restrict the field of view of sensor 19, while providing a larger field of view for solar cell 48, which larger field of view includes the lesser field of view of sensor 19. In this way, a measure of anticipation is provided, whereby the direct rays of the sun may be detected by the solar cell 48 and the protective shutter mechanism actuated prior to such harmful rays falling upon sensor 19. Also included in the arrangement of FIG. 6 are an infrared bandpass filter of the type described above, together with an optical lens arranged to focus the filtered light energy upon cell 19 (when exposed thereto by shutter mechanism 44). The compact packaging of such sensor arrangement also allows the inclusion of a solid-state preamplifier stage 51. Hence, the electrical signal output of sensor 19 may be amplified prior to transmittal from that location on the airborne vehicle providing an unobstructed view of the aircraft carrier or landing system projector, to the point of utilization in the vehicle, as to enhance the receiver system signal-to-noise ratio. In other words, the effect of electrical noise, picked up by the system intercabling, is reduced or less noticeable when the signal levels transmitted over such cabling are increased relative to such noise level.

The narrow bandpass signalling elements 13 of FIG. 1 have been illustrated in FIG. 3 as comprising an indicator element 18 responsive to a narrow bandpass filter circuit 17. Both the function of indication and the function of narrow bandpass filtering of an excitation producing such indication, may be combined in an electrically-excited, mechanically-tuned reed assembly, as shown more particularly in the exploded view of FIG. 7.

Figure 7:
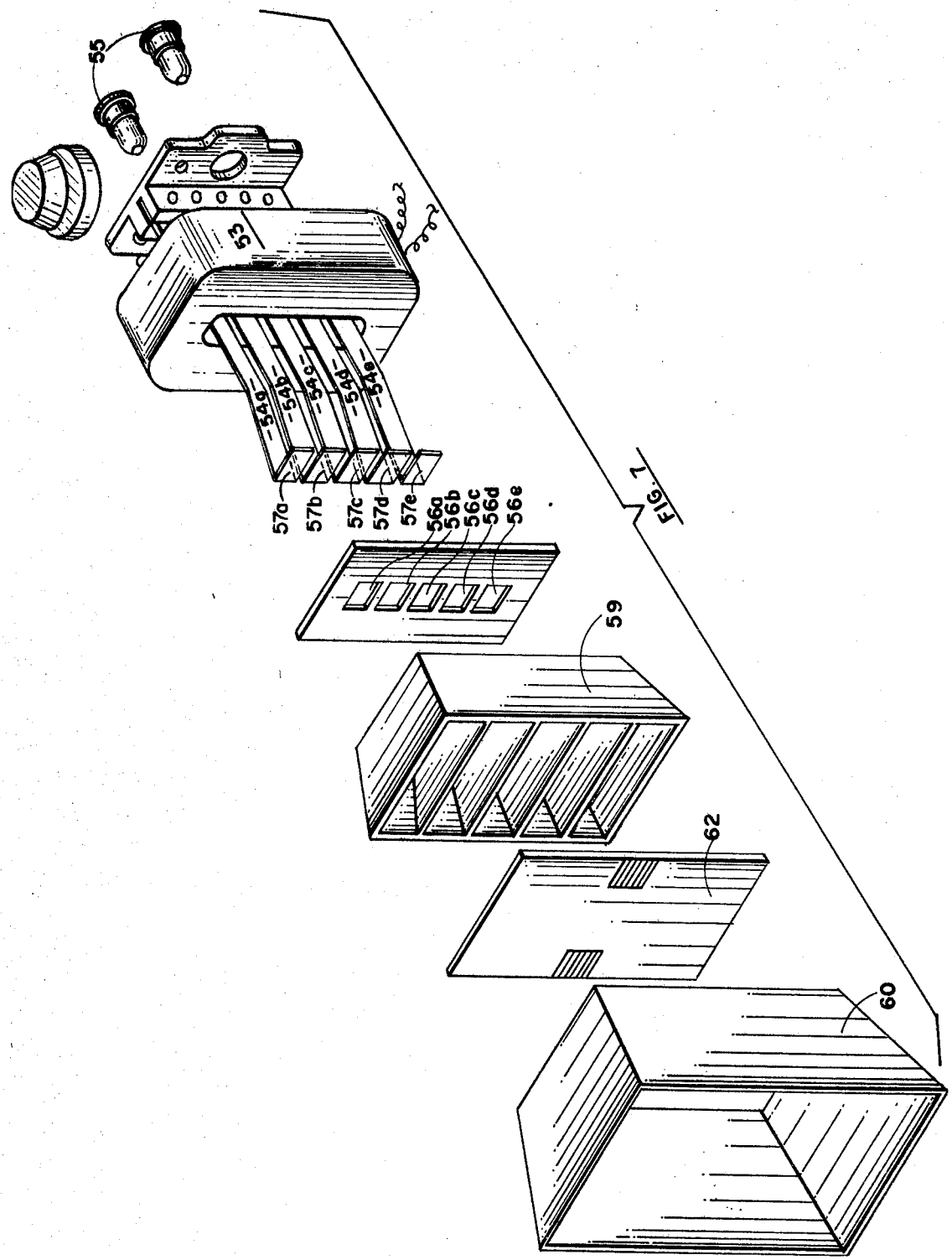
FIG. 7 is an exploded view of a preferred embodiment of the display indicating means of FIG. 3.

Referring to FIG. 7, there is illustrated a preferred embodiment of narrow bandpass signalling means adapted to cooperate with the bandpass limited receiver of FIGS. 1, 3 and 5. There is provided a vibrating reed frequency discriminator comprising an electrical solenoid or coil 53 arranged in magnetic circuit with a plurality of magnetically actuable reeds 54, each reed mechanically tuned to vibrate at a mutually distinct frequency corresponding to successive ones of the intensity-modulating frequencies employed in the system transmitter or projector of FIG. 2. Such vibrating reed frequency discriminator assemblies are well known in the art, being commercially available. Upon the application of an electrical excitation to coil 53 (from terminal 20 of FIG. 5) of a signal current having a spectral component corresponding to one or more of the tuning frequencies of the tuned or vibrating reeds, a corresponding magnetically actuable reed is magnetically actuated to vibrate in response thereto.

A display useful under a variety of cockpit lighting conditions (daylight, night time, etc.) is also achieved by the illustrated arrangement of FIG. 7. Illumination provided by instrument lights 55, mounted internally of the assembly and in back of the excitation coil 53, is blocked from a like plurality of apertures or windows 56 as reeds, when the reeds are unactuated, by light valves 57 mounted upon the ends of such reeds. Upon the actuation or vibration of a given one of reeds 54 in response to a corresponding excitation frequency applied to coil 53, the motion of the reed provides intensity-modulation transmission, rather than blockage, of the light beam through the corresponding window 56 of mask 58. The mechanical tuning of each reed is, of course, preferably accomplished with an associated light valve element affixed thereto.

Improved viewing under daylight viewing conditions is provided in FIG. 7 by means of a baffle 59 and hood 60. Also, a rheostat 61 or like means may be conveniently mounted for intensity control of lamps 55. Further, an illuminated datum is provided by a ground glass plate 62 on which are etched a vertical array of horizontal datum lines 63 on either side of the intended projection of the datum or reference light beam associated with window 56 of mask 58. Illumination of the datum lines results from diffusion within the ground glass of light from any illuminated one of windows 56, when the receiver sensor is situated within and illuminated by the stacked beam array of FIG. 2.

Where a tinted visible light source is used with the projector of FIG. 2, a corresponding tint or color filter may be employed in the windows 56 of the arrangement of FIG. 7, in order to reduce the effort of the pilot's transition of attention between the cockpit display and the display projector, and to make easier the identification and location of the several displays to be utilized.

Figure 8:
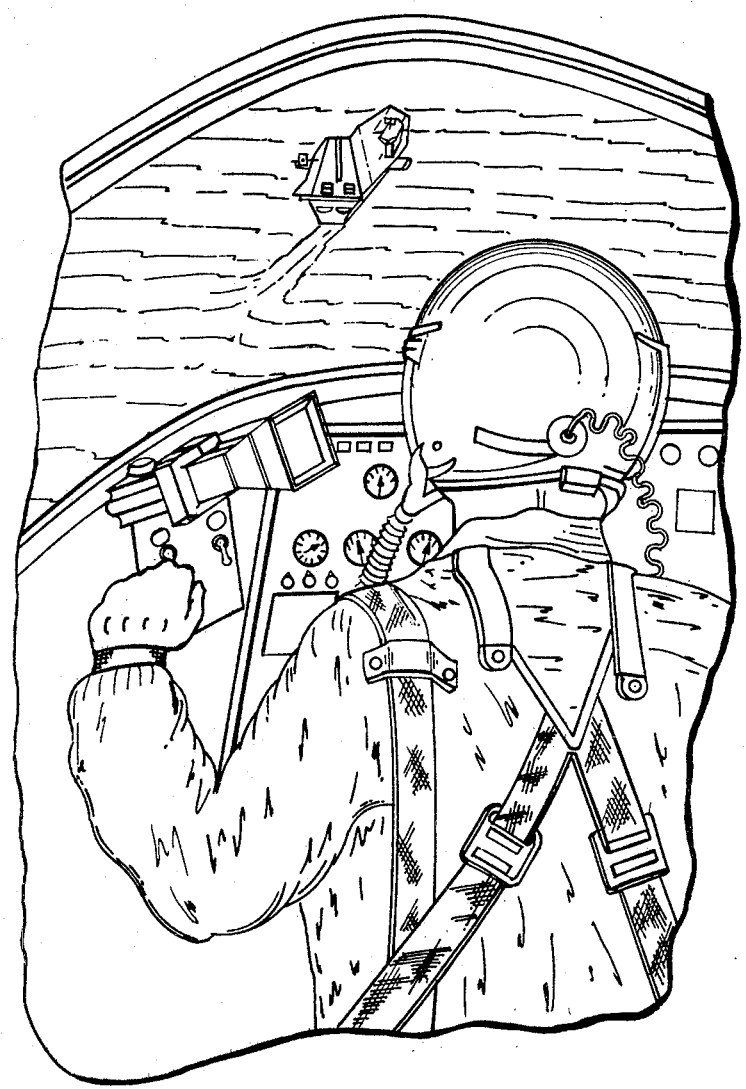
FIG. 8 is a perspective view of the receiver indicator of FIG. 5 installed in an aircraft in which the inventive concept may be advantageously employed.

A convenient arrangement, allowing pilot observation of the display indicator (of FIG. 7) and an optical landing system projector, alternatively, is shown in FIG. 8. By means of such arrangement, the display device is located within the cockpit, preferrably forward of the pilot without blocking his view through the windscreen of his aircraft, the hood or viewing end of the device facing toward the pilot. Such preselected orientation and location of the device represent a fixed geometrical relationship thereof relative to the pilot's station for providing a local optical display occupying an increased or enhanced view angle to the pilot, relative to that occupied by the carrier-borne (or land-based) optical landing system at those ranges or distances at which the glide path or landing maneuver is initiated.

Accordingly, it is to be appreciated that an optical landing aid has been described which provides improved utility at increased ranges, due to increased sensitivity and due to a novel display indicator which avoids the effects of angular resolution limits of the human eye.

Although the device has been described in terms of providing a local cockpit display for use by the pilot of an aircraft-to-be-landed, it is to be understood that a signal light array may be mounted on the aircraft and exterior thereof and oriented to provide a display to the landing control officer on the deck of the aircraft carrier. Although the inventive concept has been described in terms of means for determining vertical position within a vertical array of stacked beams of illuminating energy, it is clear that the concept equally comprehends the determination of lateral position within a horizontal array of stacked beams. Also, a dual indicating system may be employed to indicate both lateral and vertical position, or two other mutually orthogonal components of spatial position within a preselected spatial reference. Further, the indicating system is not limited to a visual indicating system, but comprehends the alternative use of coded audio signalling and tactile devices ("feelies") responsive to the mutually exclusively coded energy beams of a stacked beam array. Moreover, although the device has been described in terms of an indicator for a human pilot, the inventive concept is not so limited, the discrete signalling states of the signalling device being equally adaptable for cooperation with a recording device as an oscillograph for use as a training aid in analyzing pilot performance; alternatively, such discrete signal states may be employed for actuation of the flight controls of a utilizing vehicle as to effect closed loop flight path control either concomitantly with or alternative to such display function. Further, although the concept of the invention has been described in terms of an aircraft landing aid, the concept is not so limited, the invention being adapted to determining the location of any utilizing platform within a stacked array of beams of light energy, such as in a station-keeping function of one vehicle relative to another or in a docking maneuver or rendezvous of one space vehicle with another. Moreover, although the invention has been described and illustrated in terms of embodiments employing a projected array of beams of light energy, the concept of the invention is not so limited and any form of directionally propagated energy may be employed.

Although the invention has been described and illustrated in detail, it is to be clearly understood that the same is by way of example only, and not by way of limitation.

I claim:

1. Local indicating means located on an observer's platform in a fixed geometrical relationship to an observer's station for reproducing a remotely located optical display indicative of that one of a stacked array of periodically intense light beams by which said platform is illuminated, comprising
  means responsive to said light beams and having a responsive bandwidth inclusive of the mutually exclusive frequencies at which each of said light beams are modulated; and
  means responsive to said light beams and having a plurality of responsive bandwidths, each inclusive of a mutually exclusive one of the mutually exclusive frequencies at which each of said light beams are modulated, for indicating the identity of those beams by which the platform is illuminated.

2. A system for indicating that beam of an array of stacked radiant energy beams by which a platform is illuminated, comprising
  means for intensity modulating at least a portion of the spectrum of each of said energy beams at a mutually exclusive modulating frequency; and
  means mounted on said platform and adapted to be responsive to the modulated spectrum of said radiant energy and having a plurality of narrow bandpass outputs, the center frequency of each output corcorresponding to a mutually exclusive one of said modulating frequencies.

3. Means for determining the angular location of a platform, comprising
  means for transmitting a stacked array of radiant energy beams, each beam intensity-modulated at a mutually exclusive modulating frequency; and
  means mounted on said platform and further adapted to be responsive to said radiant energy and having a response bandwidth inclusive of said modulating frequencies for indicating the presence of said platform within a field of view illuminated by said stacked array.

4. The device of claim 3 in which said means responsive to said radiant energy comprises
  single common radiant energy sensing means having a response bandwidth comprising said transmitted radiant energy for providing an electrical output indicative of a sensed modulation envelope; and
  a plurality of narrow-bandpass signalling means commonly responsive to said common sensing means, each having a center frequency corresponding to a mutually exclusive one of said transmitted modulating frequencies for indicating the identity of those beams in said stack array by which said vehicle is illuminated.

5. The device of claim 4 in which there is further provided an array of indicating elements, each element of said array of indicating elements corresponding to a like-disposed beam of said array of stacked beams, each of said indicating elements responsively coupled to the output of that one of said filters having a center-frequency corresponding to the amplitude-modulation frequency associated with said beam of said stacked array.

6. The device of claim 3 in which said beams of said stacked array are of a single common wavelength of radiant energy.

7. The device of claim 3 in which said means for transmitting includes
  single common drive means for synchronously amplitude-modulating said stacked array; and
  a plurality of ratio-changing means, each in cooperation with said common drive means and a mutually exclusive one of said modulated beams of said array for providing a mutually exclusive modulation frequency therefor.

8. The device of claim 3 in which said means for transmitting includes means for transmitting a stack array of beams of radiant energy of a single common wave length and comprising
  single common drive means for synchronously amplitude modulating said stacked array; and
  a like plurality of ratio-changing means as said beams of said array, each said ratio-changing means in cooperation with said common drive means and a mutually exclusive one of said modulated beams of said array for providing a mutually exclusive modulation frequency therefor.

9. Position-angle determining means comprising
  a preselectively oriented array of intensity-modulated light sources, each modulatde at a mutually-exclusive frequency;
  a single photoelectric sensor adapted to be responsive to said light sources for providing an electrical output having a composite spectral content indicative of illumination received from said array; and
  a like plurality of frequency-responsive indicating means having a center frequency corresponding to a respective one of said intensity-modulating frequencies, whereby those ones of the light-beams provided by said array in which said sensor is located may be determined.

10. The device of claim 9 in which there is further included automatic gain control means interposed between the inputs of said indicating means and the bandpass limited output of said sensor.

11. The device of claim 9 in which said mutually exclusive modulating frequencies are contained within the bandpass region above 100 c.p.s. and below 400 c.p.s. and are non-harmonically related.

12. The device of claim 9 in which there is further provided means for attenuating the effects of high ambient light levels, light source energy variations, and sensor saturation upon system performance, comprising automatic aperture adjusting means interposed within the optical field of view of said sensor, and responsive to the bandpass limited output of said sensor.

13. The device of claim 9 in which there is further provided means for attenuating the effects of high ambient light levels, light source energy variations and sensor saturation upon system performance, comprising means interposed with the optical field of said sensor for reducing the aperture thereof in response to an output of said sensor above a preselected proportion of the saturation level thereof; and automatic gain control means interposed between the inputs of said indicating means and the bandpass-limited output of said sensor.

14. The device of claim 9 in which said intensity modulated light sources are modulated at a non-visible portion of the spectra transmitted by said light-sources, and in which said sensor is bandwidth limited at an input thereof to respond to said modulated non-visible portion of said transmitted spectra and not respond to the visible portion of said transmitted spectra.

References Cited

UNITED STATES PATENTS 3,370,269   2/1968   Jasper _____ 340—29

ALVIN H. WARING, Primary Examiner

U.S. Cl. X.R.

73—178; 340—332, 366